(12) United States Patent  
Hoddie

(10) Patent No.: US 7,747,279 B2  
(45) Date of Patent: Jun. 29, 2010

(54) INTERFACE NEGOTIATION

(75) Inventor: J. Peter Hoddie, Menlo Park, CA (US)

(73) Assignees: Sony Corporation, Tokyo (JP); Kinoma, Inc., Palo Alto, CA (US)

( * ) Notice: Subject to any disclaimer, the term of this patent is extended or adjusted under 35 U.S.C. 154(b) by 459 days.

(21) Appl. No.: 10/814,909

(22) Filed: Mar. 30, 2004

(65) Prior Publication Data

US 2005/0221858 A1    Oct. 6, 2005

(51) Int. Cl.
 *H04B 7/24* (2006.01)
 *H04B 17/00* (2006.01)
 *H04B 1/38* (2006.01)

(52) U.S. Cl. .................. 455/557; 455/67.14; 455/39

(58) Field of Classification Search .......... 455/557, 455/426.2, 422.1, 554.1, 7, 39, 41.2, 502, 455/67.14, 69
See application file for complete search history.

(56) References Cited

U.S. PATENT DOCUMENTS

| | | | | |
|---|---|---|---|---|
| 5,787,363 | A * | 7/1998 | Scott et al. | 455/557 |
| 2004/0023652 | A1 | 2/2004 | Shah et al. | |
| 2004/0072593 | A1* | 4/2004 | Robbins et al. | 455/560 |
| 2004/0116149 | A1* | 6/2004 | Yukie et al. | 455/550.1 |
| 2004/0127214 | A1* | 7/2004 | Reddy et al. | 455/426.2 |
| 2004/0184100 | A1* | 9/2004 | Shahindoust | 358/1.15 |
| 2004/0204071 | A1* | 10/2004 | Bahl et al. | 455/557 |
| 2004/0204076 | A1* | 10/2004 | Kotzin | 455/557 |
| 2004/0253945 | A1* | 12/2004 | Janik | 455/419 |
| 2005/0048987 | A1* | 3/2005 | Glass | 455/456.1 |
| 2005/0076054 | A1* | 4/2005 | Moon et al. | 707/103 Y |
| 2005/0085188 | A1* | 4/2005 | Ishii et al. | 455/41.2 |
| 2005/0141450 | A1* | 6/2005 | Carlton et al. | 370/329 |
| 2005/0164634 | A1* | 7/2005 | Tanaka et al. | 455/41.2 |
| 2005/0186906 | A1* | 8/2005 | Hussmann | 455/41.2 |
| 2005/0190920 | A1* | 9/2005 | Ahonen | 380/274 |
| 2005/0282530 | A1* | 12/2005 | Raff | 455/418 |
| 2006/0007920 | A1* | 1/2006 | Michel et al. | 370/352 |

* cited by examiner

*Primary Examiner*—Nay A Maung
*Assistant Examiner*—Andrew Wendell
(74) *Attorney, Agent, or Firm*—Procopio, Cory, Hargreaves & Savitch LLP

(57) ABSTRACT

Methods and apparatus for interface negotiation using a device supporting multiple communication interfaces. In one implementation, a wireless device includes: a wireless communication interface supporting communication across a wireless connection; and a controller connected to said wireless interface supporting a negotiation service and a communication service; wherein said negotiation service provides interface negotiation for using said wireless interface to negotiate with another device to select a communication interface for communication with said another device, and said communication service provides control and management of communication with said another device across a connection established using said negotiation service.

33 Claims, 5 Drawing Sheets

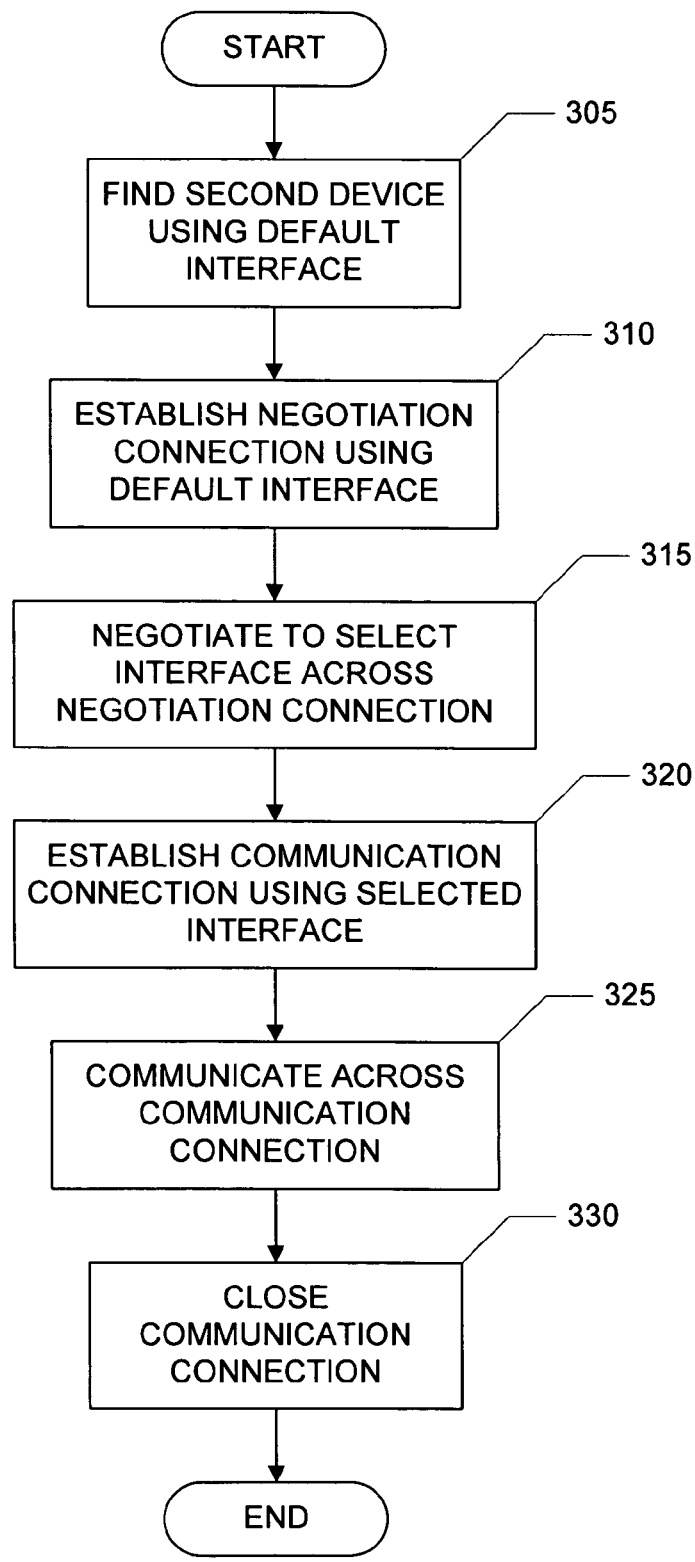

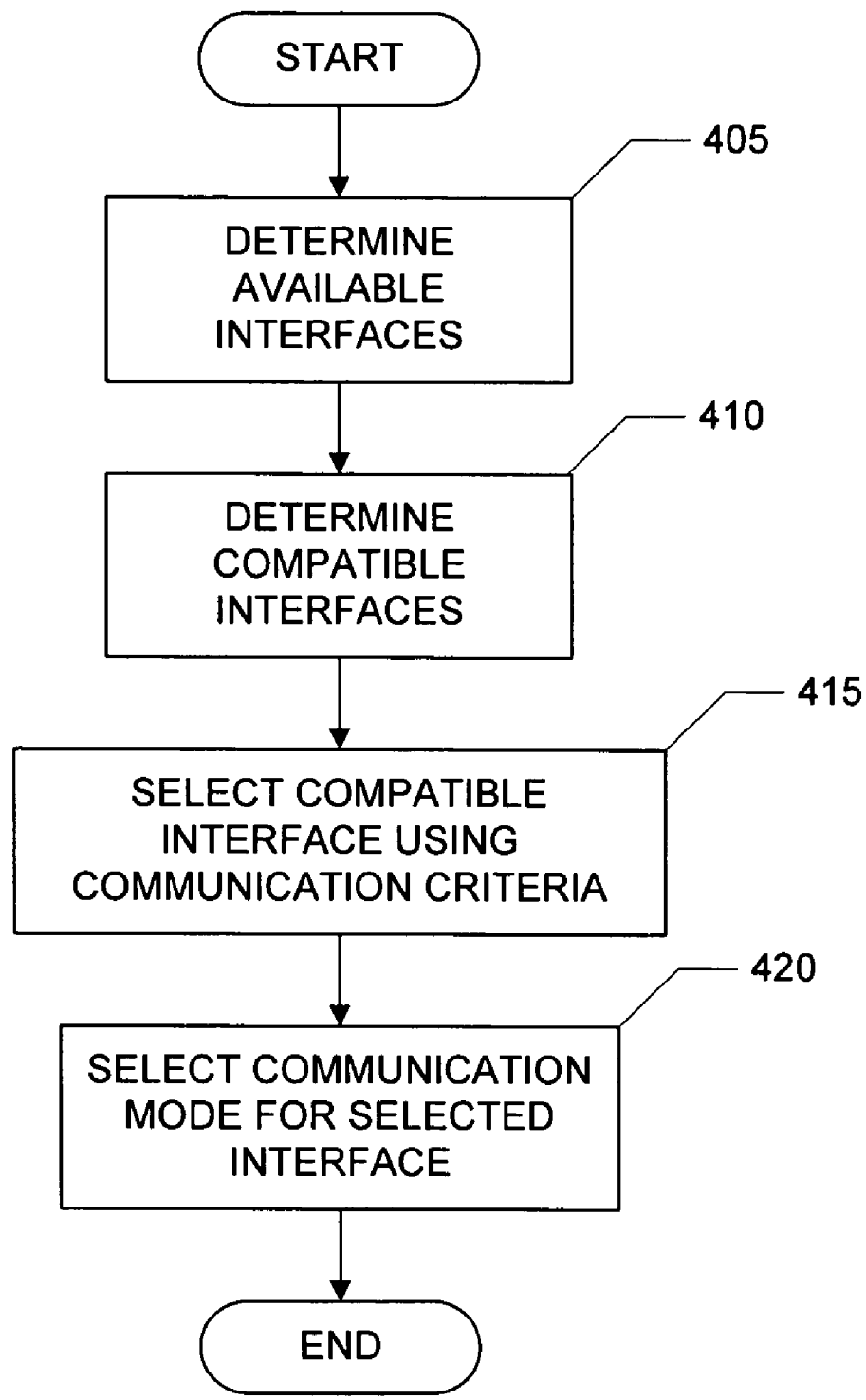

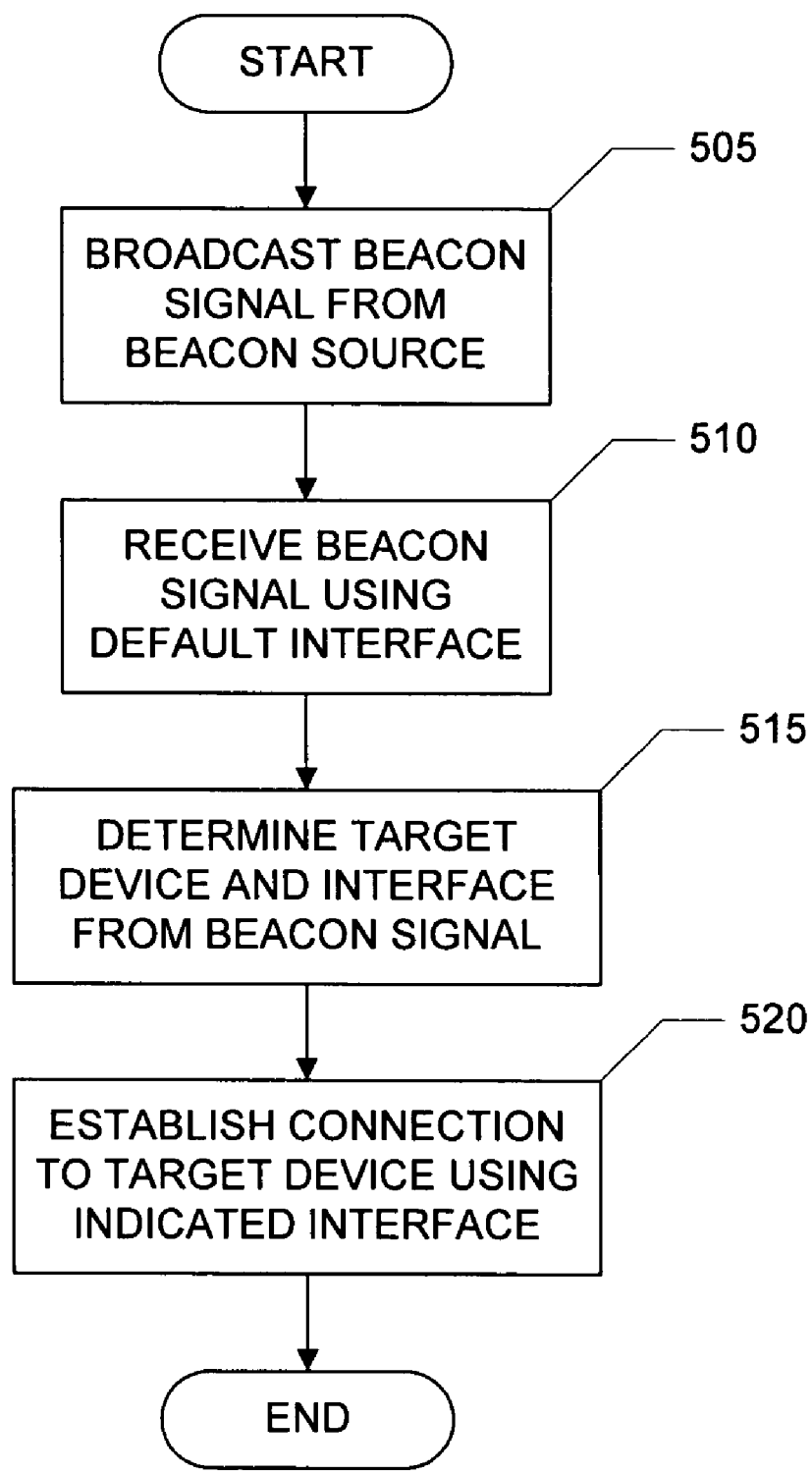

INTERFACE NEGOTIATION

BACKGROUND

Some wireless devices provide multiple interfaces for communication. For example, a wireless device may include a PAN interface (personal area network) and a wireless LAN interface (local area network), such as Bluetooth and Wi-Fi (e.g., IEEE 802.11.b). When a user of such a multiple interface device wants to communicate with a user of another device, the user typically manually determines what common interface is available, such as by directly talking with the second user. After determining the common interface, the users typically manually configure the devices to establish a connection for communication. To change or end the connection, the users again manually adjust the configuration of the devices. While the users have been able to establish communication, for some users the manual configuration and control may prove difficult.

SUMMARY

The present invention provides methods and apparatus for interface negotiation using a device supporting multiple communication interfaces. In one implementation, a wireless device includes: a wireless communication interface supporting communication across a wireless connection; and a controller connected to said wireless interface supporting a negotiation service and a communication service; wherein said negotiation service provides interface negotiation for using said wireless interface to negotiate with another device to select a communication interface for communication with said another device, and said communication service provides control and management of communication with said another device across a connection established using said negotiation service.

In another implementation, a method of interface negotiation includes: searching for a second device using a default interface of a first device; establishing a negotiation connection between said first device and said second device using said default interface; negotiating to select a communication interface using said negotiation connection; establishing a communication connection using said selected interface; communicating between said first device and said second device using said communication connection; and closing said communication connection; wherein said default interface is a wireless interface.

BRIEF DESCRIPTION OF THE DRAWINGS

FIG. 3 shows a flowchart of one implementation of communicating between two wireless devices using interface negotiation.

FIG. 4 shows a flowchart of one implementation of negotiating to select an interface for a communication connection.

FIG. 5 shows a flowchart of one implementation of using a beacon signal for interface negotiation.

DETAILED DESCRIPTION

Figure 1:
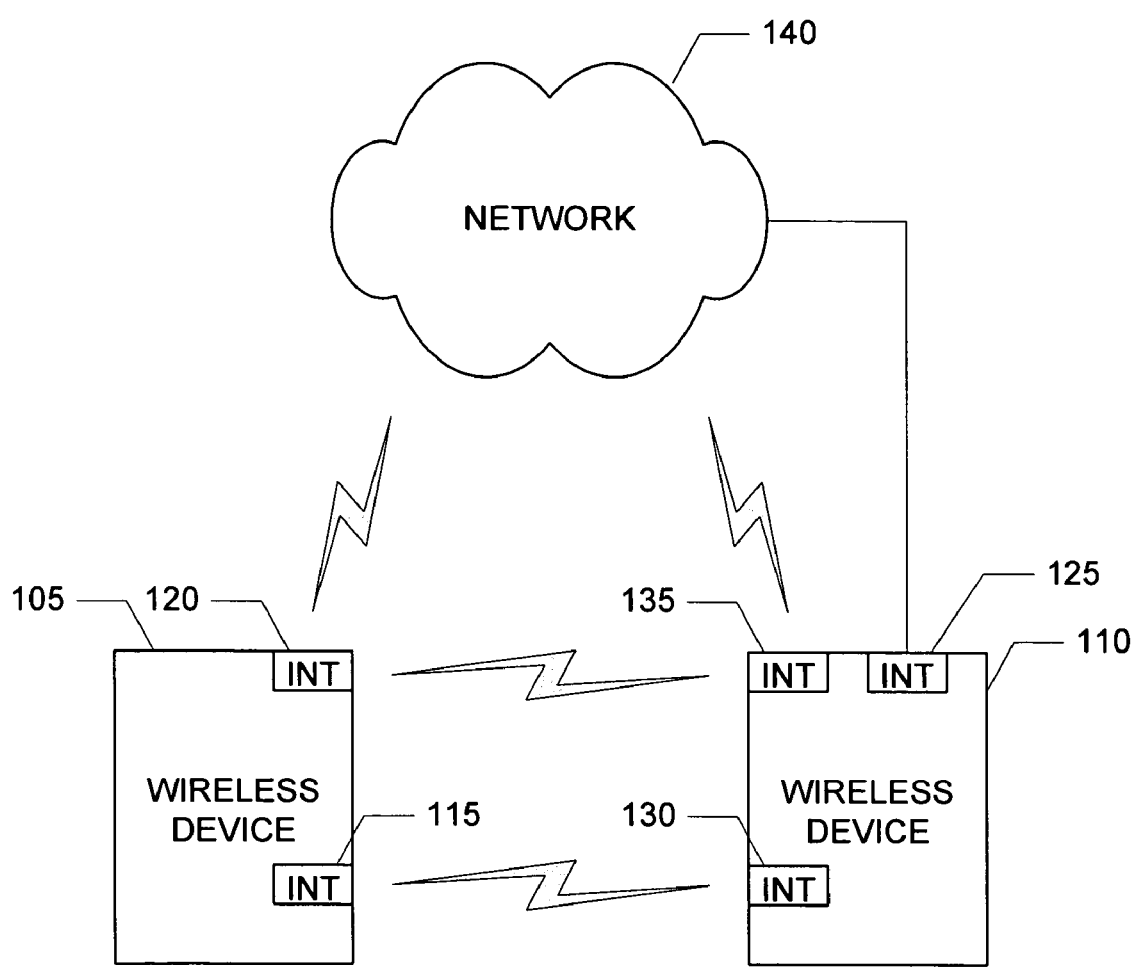
FIG. 1 shows a representation of a network environment including a first wireless device and a second wireless device.

The present invention provides methods and apparatus for interface negotiation using a device supporting multiple communication interfaces. In one implementation, a wireless device includes two wireless interfaces: a low-speed interface and a high-speed interface. To communicate with a similar device, the first device opens a connection to the second device using the low-speed interface. The two devices negotiate how to continue communication, such as based on how much data is to be sent. If the devices determine to use the high-speed interface, the devices open a second connection using the high-speed interface and proceed to communicate across the second connection. When the communication is complete, the devices close the open connection(s).

Several illustrative examples of implementations are presented below. These examples are not exhaustive and additional examples and variations are also described later.

In one example, a PDA (a personal digital assistant, such as the CLIÉ™ by Sony Corporation) includes components to support communication using a PAN interface and a wireless LAN interface, such as Bluetooth or UWB (ultra wideband) and Wi-Fi. A laptop computer (such as a portable computer in the VAIO™ series by Sony Corporation) also includes components to support communication using Bluetooth and Wi-Fi. A user of the PDA wants to send a data file to a user of the laptop. Using the user interface of the PDA, the PDA user selects a "send file" operation and a file to send. In response, the PDA activates the Bluetooth components and the PDA searches for other devices available for communication using Bluetooth. The laptop user has previously activated the Bluetooth components of the laptop and so the PDA recognizes the laptop as an available device. The PDA and laptop open a Bluetooth connection to negotiate further communication. The PDA confirms with the PDA user that the laptop is the intended recipient of the selected file. After receiving the confirmation to proceed, the PDA and laptop determine the available interface(s) of the other device through queries sent to the other device. In this case, the PDA and laptop find that each supports Wi-Fi communication. The devices then use the Bluetooth connection to negotiate how to send the file. The PDA recognizes that the size of the file would make it more appropriate to send the file to the laptop across a Wi-Fi connection (because of the improved bandwidth of the Wi-Fi connection compared to a Bluetooth connection) and so the PDA and laptop agree on setting up a Wi-Fi connection. In this example, the devices determine that an access point to the Internet or a LAN is not available and agree on the details of setting up an "ad hoc" wireless network (e.g., a service set identifier (SSID) and encryption settings) to open the Wi-Fi connection. The devices open the Wi-Fi connection and keep the Bluetooth connection open (e.g., as a control channel). Once the connection is open, the PDA sends the file to the laptop across the Wi-Fi connection. When the file transfer is complete, the devices use the Bluetooth connection to agree that the Wi-Fi connection is no longer needed and the devices close the Wi-Fi connection. The devices maintain the Bluetooth connection while it is available (e.g., subject to transmission range limitations).

In another example, a PDA includes components to support communication using Bluetooth and Wi-Fi. A user of the PDA activates the Bluetooth interface and brings the PDA into a store. The store has one or more wireless devices broadcasting information about the store and merchandise using Bluetooth. For example, one device broadcasts the business information of the store (e.g., address and telephone information) and information needed to connect to a wireless LAN provided by wireless access points positioned in the store (e.g., an SSID). Another set of devices broadcasts information about particular products, such as price, availability, and a URL (uniform resource locator) for a network resource providing more information about the product. The PDA user walks up to a product of interest in the store and views on the PDA some basic information provided by the Bluetooth device corresponding to that product (e.g., where the Bluetooth device is attached to the product display). If the user wants more information on the product, the user can select a "more information" option in the displayed information. In response, the PDA uses the provided wireless LAN information to open a connection to the wireless LAN of the store and the URL provided by the product's Bluetooth device to access a network resource (e.g., an HTML page) across the LAN connection. The user can then access more information about the product through the Wi-Fi connection.

In another example, a digital camera includes components to support communication using Bluetooth and Wi-Fi. A laptop computer also includes components to support communication using Bluetooth and Wi-Fi. A user has activated the Bluetooth interfaces for the camera and the laptop. The user takes a picture using the camera, storing the digital image as a data file in the storage of the camera. The user selects a "store" operation for the camera indicating an image file and a storage location on the laptop (such as by using previously stored information about the laptop). The camera opens a Bluetooth connection to the laptop (or uses an already open connection). Using the Bluetooth connection, the camera and laptop negotiate a transfer of the image file from the camera to the laptop. In this example, the image file data size is large, so the camera and laptop open a Wi-Fi connection and transfer the file. After the transfer is complete, the camera and the laptop close the Wi-Fi connection. The user then adds a title to the image using the camera user interface and selects an "update" operation, indicating the image file stored on the laptop. The camera and laptop negotiate a transfer of the title information from the camera to the laptop. The data size of the title information is small, so the camera and laptop use the open Bluetooth connection to transfer the title information. The devices maintain the Bluetooth connection while it is available.

FIG. 1 shows a representation of a network environment 100 including a first wireless device 105 and a second wireless device 110. The first wireless device 105 includes two wireless interfaces: a short-range wireless interface 115 and a medium-range wireless interface 120. The second wireless device 110 includes a wired interface 125, a short-range wireless interface 130, and a medium-range wireless interface 135. In one implementation, the short-range wireless interfaces 115 and 130 are personal area network interfaces, such as Bluetooth, and the medium-range wireless interfaces 120 and 135 are local area network interfaces, such as Wi-Fi. In one implementation, the wired interface 125 is a network cable interface, such as an RJ-45 connection supporting an Ethernet interface. In other implementations, a wireless device can include more, less, or different interfaces then those shown in FIG. 1.

In the network environment 100 shown in FIG. 1, the wireless devices 105 and 110 can establish connections for direct communication using the short-range wireless interfaces 115 and 130 or the medium-range wireless interfaces 120 and 135. The wireless devices 105 and 110 can also establish connections for indirect communication through a network 140 using the medium-range wireless interface 120 of the first wireless device 105 and either the medium-range wireless interface 135 or the wired interface 125 of the second wireless device 110. As described below, the wireless devices 105 and 110 can use the short-range wireless interfaces 115 and 130 to initially establish communication and negotiate how to proceed with further communication. For example, the wireless devices 105 and 110 may agree to use a connection through the network 140, where the first wireless device 105 establishes a connection to the network 140 using the medium-range wireless interface 120 to connect to a wireless access point of the network 140 and the second wireless device 110 establishes a connection to the network 140 through the wired interface 125.

Figure 2:
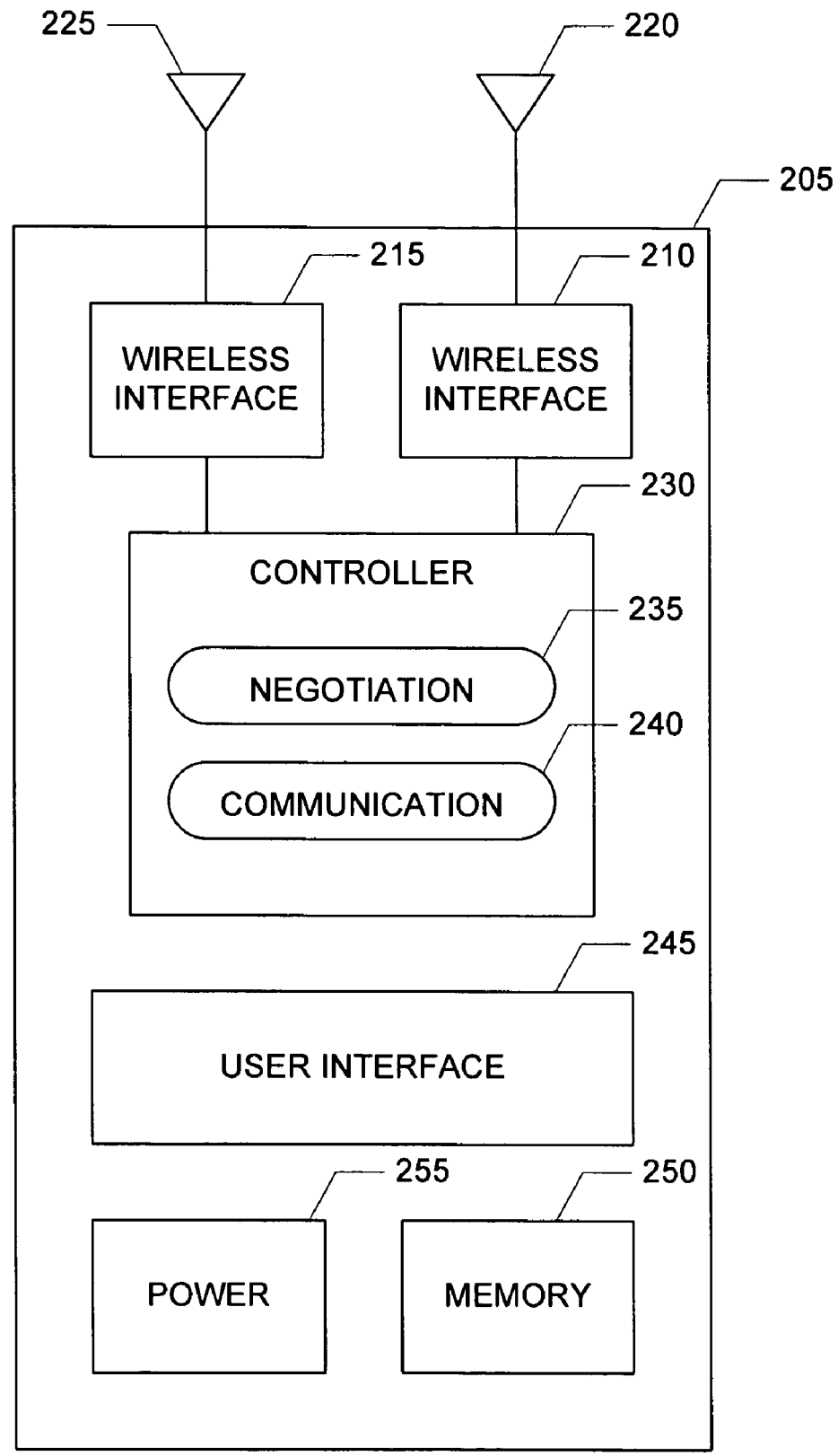
FIG. 2 shows a block diagram of one implementation of a wireless device supporting interface negotiation.

FIG. 2 shows a block diagram of one implementation of a wireless device 205 supporting interface negotiation. The wireless device 205 can be implemented in various forms, such as a PDA, a cellular or PCS mobile phone, a laptop computer, or some other portable or fixed system. The wireless device 205 includes a first wireless interface 210 and a second wireless interface 215. The two wireless interfaces 210 and 215 are different in one or more ways, such as being short-range and medium-range, high-power and low-power, high-cost and low-cost (e.g., an interface cost and/or a usage cost), high-bandwidth and low-bandwidth, or high-speed and low-speed, etc. For example, the first wireless interface 210: is a short-range, low-power, low-bandwidth interface (e.g., Bluetooth) and the second wireless interface 215 is a medium-range, high-power, high-bandwidth interface (e.g., Wi-Fi). The wireless interfaces 210 and 215 are connected to respective antennas 220 and 225. In one implementation, two or more wireless interfaces share an internal or external antenna. Each wireless interface operates with its antenna to support wireless connections according to the wireless technology of the interface, such as in a typical wireless interface of the same type. In other implementations, the wireless device can include different types or numbers of wireless or wired interfaces. Examples of interfaces include, but are not limited to: Wi-Fi (IEEE 802.11 family interfaces), WiMAX, Bluetooth, ultra wide band (UWB), cellular or PCS telephony or data interfaces, non-radio-based wireless interfaces (e.g. infrared), local area or wide area wired interfaces (e.g., coaxial or network cable connections or ISDN connections).

The wireless device 205 includes a controller 230 connected to each of the wireless interfaces 210 and 215. The controller 230 controls the operation of the wireless device 205 and its components. The controller 230 provides a negotiation service 235 and a communication service 240 (represented in FIG. 2 by rounded boxes inside of the controller 230). The negotiation service 235 controls the selection of interfaces for communication and the negotiation with another wireless device to determine available interfaces and agree upon an interface, as described below. The communication service 240 controls the communication and interaction across a selected interface. The negotiation service 235 and communication service 240 are implemented as software components of the controller 230. Alternatively, these service can be implemented as separate components or hardware components of the wireless device.

The wireless device 205 also includes a user interface 245, memory 250, and a power source 255. The user interface 245 (e.g., a display and input buttons) supports user interactions with the wireless device 205. The memory 250 (e.g., RAM and ROM memory or removable memory) provides storage for the components of the wireless device 205. The power source 255 (e.g., a battery or external power connection) provides power to components of a wireless device 205. The interconnections among the user interface 245, memory 250 and power source 255 and other components of the wireless device 205 are not shown in FIG. 2 for clarity.

FIG. 3 shows a flowchart 300 of one implementation of communicating between two wireless devices using interface negotiation. Initially, a wireless device having at least two wireless interfaces is within range of a second wireless device having at least one wireless interface compatible with an interface of the first device. The first device and the second device both have at least one compatible wireless interface active.

The first device finds the second device using a default interface, block 305. One of the wireless interfaces of the first device is a default interface. The first device uses the default interface for initially searching for and establishing connections with other devices for interface negotiation. In one implementation, the default interface is a low-power or inexpensive interface, such as Bluetooth. If the first device does not find the second device, the first device continues to search for the second device by periodically polling the area using the default interface. In one implementation, if the first device does not find the second device (or any other device) using the default interface, the first device searches for the second device using each of the remaining interfaces until another device is found. In this case, while no other device is found the first device continues to cycle through the available interfaces. In one implementation, the first device searches for a particular device using a particular interface according to a request input by a user of the wireless device. In another implementation, the first device periodically polls the local area using the default interface for available and compatible devices. For example, a device periodically sends out a beacon signal using a Bluetooth interface to find nearby and available Bluetooth-compatible devices and maintains a list of available devices.

Having found the second device, the first device establishes a negotiation connection with the second device using the default interface, block 310. The two devices use the negotiation connection to investigate information and capabilities of the other device. The two devices can also use the negotiation connection as a control channel while other connections are opened.

The two devices use the negotiation connection to negotiate to select an interface for further communication, block 315. One implementation of negotiating to select an interface is described below referring to FIG. 4.

After selecting an interface, the first device establishes a communication connection with the second device using the selected interface, block 320. In the course of the negotiation, the two devices have agreed upon a compatible and available interface and operation mode for communication. The two devices establish the communication connection according to that agreement.

Once the communication connection has been established, the two devices proceed to communicate across the open communication connection, block 325. The communication across the communication connection proceeds according to the operation of the selected interface and agreed upon communication. If the negotiation connection is still open, the two devices can also exchange information across the negotiation connection while the communication connection is open. For example, the two devices can use the negotiation connection to adjust the operation of the communication connection.

When the two devices have completed the communication, the first device closes the communication connection, block 330. The two devices can agree across the communication connection that communication has completed or according to conditions agreed upon during negotiation. In one implementation, the two devices keep the negotiation connection open during communication across the communication connection and use information on the negotiation connection to determine when to close the communication connection.

In one implementation, the wireless device performs the management, selection, and negotiation of connections and interfaces automatically on behalf of the user. As a result, the user does not need to attempt to select or configure connections for communication. For example, in one implementation, a wireless device periodically polls local area for available devices and maintains an updated list of located devices. When a user requests a communication operation (e.g., requesting a file transfer), the wireless device confirms a target device (e.g., by presenting a list of available devices to the user through the user interface) and begins communication with that device. The wireless device opens a negotiation connection, negotiates to establish a communication connection and opens the communication connection automatically (e.g., as described referring to FIG. 3 and FIG. 4). Once the communication connection has been established, the wireless device presents a confirmation to the user indicating that communication is open. If the type of communication request by the user requires further user action, the user provides the needed information to the wireless device and communication proceeds. If additional information from the user is not necessary, the wireless device proceeds with the communication. When communication is complete, the wireless device closes the communication connection and presents a confirmation of the completion to the user. In other implementations, different levels of user interaction can be provided or the level user interaction can be customized, such as through preferences set by the user.

FIG. 4 shows a flowchart 400 of one implementation of negotiating to select an interface for a communication connection. Initially, two wireless devices have established a negotiation connection using a first wireless interface, such as in block 310 of FIG. 3.

The two devices determine the available interfaces, block 405. The first device sends a request to the second device for a list of available interfaces, and the second device sends a similar request to the first device. Each device maintains a list of its own available interfaces. In response to the request, the second device provides a list of the interfaces for the second device to the first device, and the first device sends a similar list to the second device.

The devices determine compatible interfaces, block 410. The first device compares the received list of the second device's available interfaces and the list of the first device's available interfaces. The first device determines which interfaces are available for both the first device and second device. These commonly available interfaces are compatible interfaces. In addition, interfaces that are different but compatible are also considered to be compatible interfaces (e.g., an interface supporting in IEEE 802.11b is compatible with an interface supporting IEEE 802.11g). The second device performs a similar determination.

The devices select a compatible interface using one more communication criteria, block 415. In one implementation, the devices use a proposal and counter proposal negotiation. The first device selects one of the compatible interfaces using communication criteria and sends a proposal to the second device. Using its own communication criteria, the second device agrees to the proposed interface or provides a counter proposal to the first device. This negotiation continues until the two devices agree upon a compatible interface or agree to end the communication. The devices may agree to use the open negotiation connection and that interface as a communication connection. Examples of communication criteria include, but are not limited to: signal strength, speed, bandwidth, data rate, power consumption, power availability, data size requirements, quality of service requirements, cost, user preferences, device manufacturer preferences, service provider preferences, licensing conditions, and advertising agreements.

After agreeing upon a compatible interface, the devices select a communication mode for the selected interface, block 420. In one implementation, the two devices use a similar process of proposal and counter proposal to agree upon a communication mode according to their communication criteria, which may be different for this aspect of the negotiation than for selecting a compatible interface. Examples of communication modes include, but are not limited to: direct communication between devices (e.g., in an ad hoc network), indirect communication (e.g., using a server or network device such as a wireless access point), a particular type of encoding, or a particular type of encryption.

In one implementation, the interface negotiation is prompted through a signal received by a wireless device. The signal provides information for establishing a connection for further communication. For example, a beacon source regularly broadcasts a beacon signal compatible with the default interface of a wireless device, so that when a wireless device comes within range of the beacon source the wireless device can receive the beacon signal and proceed with communication.

FIG. 5 shows a flowchart 500 of one implementation of using a beacon signal for interface negotiation. Initially, a beacon source is positioned in a fixed location and has a wireless beacon interface. A wireless device having a wireless interface compatible with the beacon interface is within range of the beacon source. The compatible interface of the wireless device is the default interface of the wireless device.

The beacon source broadcasts a beacon signal using the wireless beacon interface, block 505. In one implementation, the beacon source uses a short-range wireless interface for broadcasting the beacon signal, such as Bluetooth. The beacon signal includes information indicating a resource and connection information for accessing that resource. The connection information indicates a target device, a target interface, and details on how to set up a connection (e.g., an SSID or URL) to the target device through the target interface. The target device can be different from the beacon source. The beacon signal can also include information for multiple resources or connections. For example, one beacon signal indicates that a particular data file can be accessed through a URL and that a Wi-Fi connection is available in the current physical location as well.

The wireless device receives the beacon signal using the default interface of the wireless device, block 510. The wireless device determines the target device and the interface from the beacon signal, block 515. The wireless device presents information from the beacon signal to a user and whether the target interface is currently available. The user can select to open a connection according to the beacon signal. If the user requests to open a connection to the target device, the wireless device establishes a connection to the target device through the target interface, block 520. The wireless device uses the information from the beacon signal to establish the connection to the target device. In one implementation, the connection opened to the target device is a negotiation connection for further interface negotiation as described above.

In an alternative implementation, the beacon signal is supplied upon request or is accessed by the wireless device. For example, when a compatible wireless device enters the range of a beacon source, the device informs the beacon source of the device's presence and the beacon source sends the beacon signal to the wireless device. In another example, the beacon signal is provided as information readable through an infrared interface and a compatible device can read the beacon information as needed.

The various implementations of the invention are realized in electronic hardware, computer software, or combinations of these technologies. Some implementations include one or more computer programs executed by a programmable processor or computer. For example, referring to FIG. 2, in one implementation, the wireless device 205 includes one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using portable consumer electronic devices, fixed (e.g., in public spaces) or embedded systems (e.g., in transportation systems) can also be used. In addition, rather than radio-based interfaces, other communication interfaces can also be used, such as light, magnetic, or electrical. Accordingly, the present invention is not limited to only those implementations described above.

What is claimed is:

1. A wireless device, comprising:

a wireless interface configured to provide short range and low power interface for supporting communication across a wireless connection used for a negotiation service to select a communication interface, wherein the short range and low power interface provides reliable signal and reduced power consumption for negotiation;

a first communication interface for providing a medium range wireless interface;

a second communication interface for providing a wired interface; and a controller connected to said wireless interface, said controller supporting the negotiation service and a communication service;

wherein said negotiation service provides interface negotiation for using said wireless interface to negotiate with another device to select an appropriate communication interface for communication of data with said another device, and to investigate information and capabilities of said another device, wherein said negotiation service selects one of: (1) said first communication interface for direct communication between the wireless device and said another device, and (2) said second communication interface for indirect communication through a network, wherein said first communication interface is a separate interface from said wireless interface used for interface negotiation, wherein said communication service provides control and management of communication with said another device across a connection established using said negotiation service, and wherein a first connection opened using said negotiation service and said wireless interface is kept open while a second connection opened using said communication service and one of said first communication interface and said second communication interface is open so that said first connection is used to adjust the operation of said second connection.

2. The wireless device of claim 1, wherein:
said wireless interface supports Bluetooth.

3. The wireless device of claim 1, wherein:
said first communication interface supports Wi-Fi.

4. The wireless device of claim 1, wherein:
each of said wireless interface and said appropriate communication interface support respective types of wireless communication.

5. The wireless device of claim 1, wherein:
said appropriate communication interface provides a higher data rate than said wireless interface.

6. The wireless device of claim 1, wherein:
said appropriate communication interface uses more power than said wireless interface.

7. The wireless device of claim 1, wherein:
said negotiation service provides interface negotiation automatically.

8. The wireless device of claim 7, wherein:
said negotiation service provides interface negotiation in response to a request by a user.

9. The wireless device of claim 7, wherein:
said negotiation service selects said appropriate communication interface without user input.

10. The wireless device of claim 7, wherein:
said negotiation service selects said appropriate communication interface using settings previously provided by a user.

11. The wireless device of claim 1, wherein:
said wireless interface supports a direct connection to said another device.

12. The wireless device of claim 11, wherein:
said direct connection is a newly established ad hoc network established with said another device.

13. The wireless device of claim 1, wherein:
said wireless interface supports receiving a beacon signal from a beacon source, and
said negotiation service uses said beacon signal to open communication.

14. The wireless device of claim 13, wherein:
said beacon signal indicates said another device as a target device and a target interface, and
said another device is different from said beacon source.

15. The wireless device of claim 13, wherein the beacon source broadcasts the beacon signal using a short-range wireless interface, such that said wireless interface configured as short range and low-power interface can receive the beacon signal to be used in said negotiation service.

16. The wireless device of claim 15, wherein the beacon signal includes information indicating a resource and connection information for accessing that resource.

17. The wireless device of claim 16, wherein the connection information includes information that indicates a target device, a target interface, and details on how to set up a connection to the target device through the target interface.

18. The wireless device of claim 15, wherein the beacon signal includes information for multiple resources or connections to indicate that a particular data file can be accessed through a connection.

19. The wireless device of claim 13, wherein the beacon signal is supplied upon request such that when the wireless device enters the range of the beacon source, the device informs the beacon source of the device's presence and the beacon source sends the beacon signal to the wireless device.

20. A method of interface negotiation, comprising:
configuring a default wireless interface as short range and low-power interface;
searching for a second device using the default wireless interface of a first device;
establishing a negotiation connection between said first device and said second device using said default wireless interface,
wherein the short range and low power interface provides reliable signal and reduced power consumption for the negotiation connection;
negotiating to select an appropriate communication interface for communicating data between said first device and said second device using said negotiation connection, and to investigate information and capabilities of said second device,
wherein selecting an appropriate communication interface includes selecting one of:
(1) a first communication interface for direct connection between the first device and the second device, and (2) a second communication interface for indirect connection through a network,
wherein said communication interface is a separate interface from said default wireless interface used for providing negotiation connection;
establishing a communication connection using said selected communication interface;
communicating data between said first device and said second device using said communication connection,
wherein said negotiation connection is open while said communication connection is open so that said negotiation connection is used to adjust the operation of said communication connection, and information on said negotiation connection is used to determine when to close the communication connection; and
closing said communication connection when the determination is made.

21. The method of claim 20, further comprising:
searching for said second device using a secondary interface.

22. The method of claim 20, wherein negotiating to select an appropriate communication interface includes:
determining one or more available interfaces;
determining one or more compatible interfaces from among said one or more available interfaces; and
selecting one of said one or more compatible interfaces as said communication interface using one or more communication criteria.

23. The method of claim 22, wherein:
said communication criteria include data rate and power use.

24. The method of claim 22, wherein negotiating to select an appropriate communication interface also includes:
selecting a communication mode.

25. The method of claim 24, wherein:
said communication mode indicates whether to use a direct connection between said first device and said second device or an indirect connection between said first device and said second device for said communication connection.

26. The method of claim 24, wherein:
said communication mode indicates a type of encryption to use for said communication connection.

27. The method of claim 19, further comprising:
receiving a beacon signal from a beacon source at said first device; and
determining a target device and a target interface using said beacon signal;
wherein said target device is said second device and said target interface is said default interface.

28. The method of claim 27, wherein:
said target device is different from said beacon source.

29. A system for interface negotiation, comprising:
means for configuring a default wireless interface as short range and low-power interface;
means for searching for a second device using the default wireless interface of a first device;
means for establishing a negotiation connection between said first device and said second device using said default wireless interface, wherein the short range and low power interface provides reliable signal and reduced power consumption for the negotiation connection;
means for negotiating to select an appropriate communication interface for communicating data between said first device and said second device using said negotiation connection, and to investigate information and capabilities of said second device,
wherein selecting an appropriate communication interface includes selecting one of:
(1) a first communication interface for direct connection between the first device and the second device, and (2) a second communication interface for indirect connection through a network,
wherein said communication interface is a separate interface from said default wireless interface used for providing negotiation connection;
means for establishing a communication connection using said selected communication interface;
means for communicating data between said first device and said second device using said communication connection,
wherein said negotiation connection is open while said communication connection is open so that said negotiation connection is used to adjust the operation of said communication connection, and information on said negotiation connection is used to determine when to close said communication connection; and
means for closing said communication connection when the determination is made.

30. The system of claim 29, further comprising:
means for determining one or more available interfaces;
means for determining one or more compatible interfaces from among said one or more available interfaces; and
means for selecting one of said one or more compatible interfaces as said communication interface using one or more communication criteria.

31. The system of claim 30, further comprising:
means for selecting a communication mode.

32. The system of claim 29, further comprising:
means for receiving a beacon signal from a beacon source at said first device; and
means for determining a target device and a target interface using said beacon signal;
wherein said target device is said second device and said target interface is said default interface.

33. A computer-readable storage medium including a computer program for use in interface negotiation, the program comprising executable instructions that cause a computer to:
configure a default wireless interface as short range and low-power interface;
search for a second device using the default wireless interface of a first device;
establish a negotiation connection between said first device and said second device using said default wireless interface,
wherein the short range and low power interface provides reliable signal and reduced power consumption for the negotiation connection;
negotiate to select an appropriate communication interface for communicating data between said first device and said second device using said negotiation connection, and to investigate information and capabilities of said second device,
wherein selecting an appropriate communication interface includes selecting one of:
(1) a first communication interface for direct connection between the first device and the second device, and (2) a second communication interface for indirect connection through a network,
wherein said communication interface is a separate interface from said default wireless interface used for providing negotiation connection;
establish a communication connection using said selected communication interface;
communicate data between said first device and said second device using said communication connection,
wherein said negotiation connection is open while said communication connection is open so that said negotiation connection is used to adjust the operation of said communication connection, and information on said negotiation connection is used to determine when to close said communication connection; and
close said communication connection when the determination is made.

* * * * *